United States Patent Office 3,728,202
Patented Apr. 17, 1973

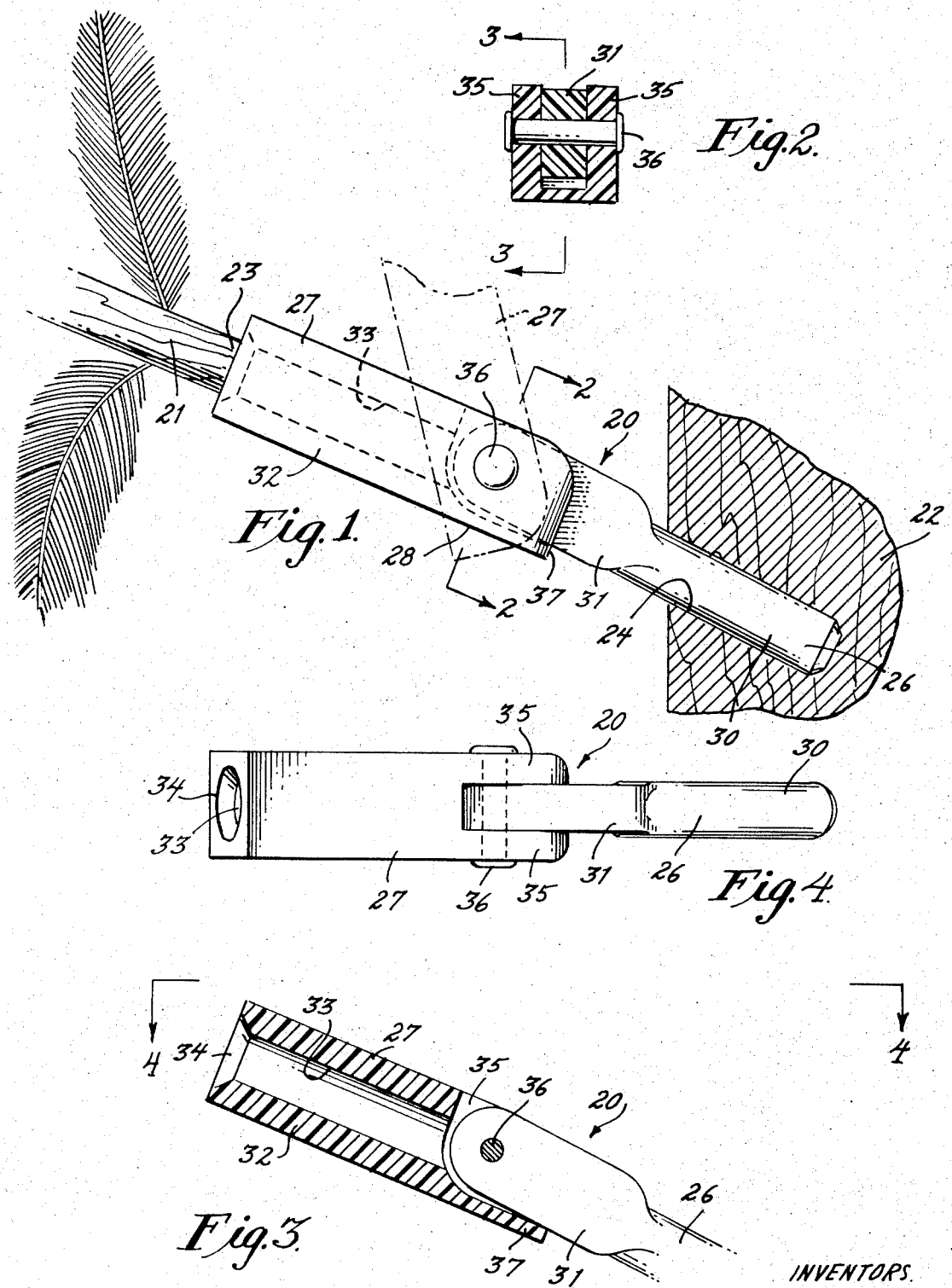

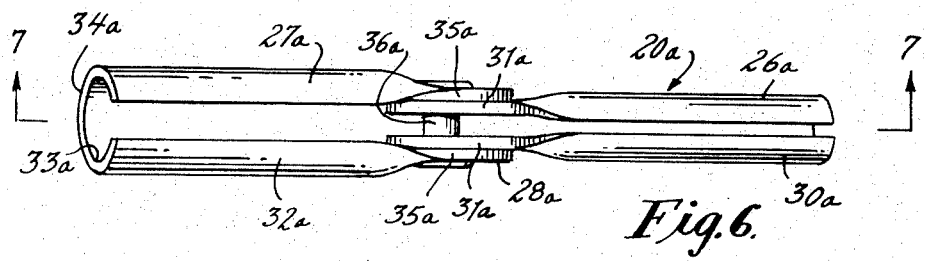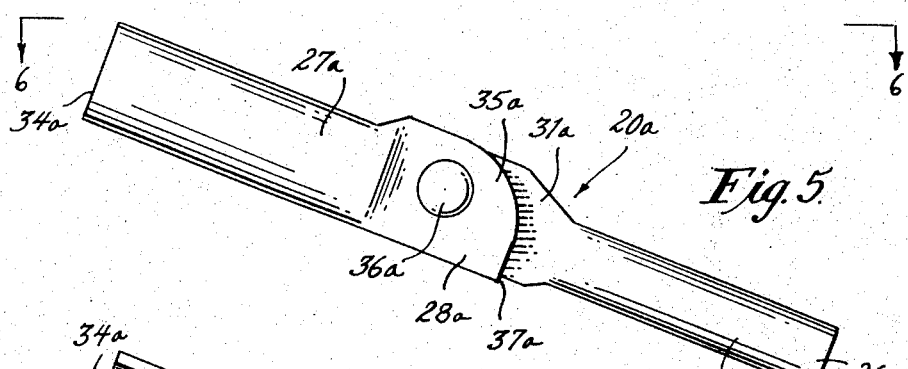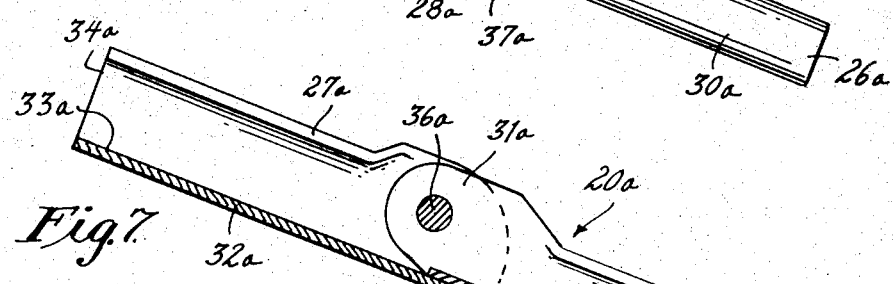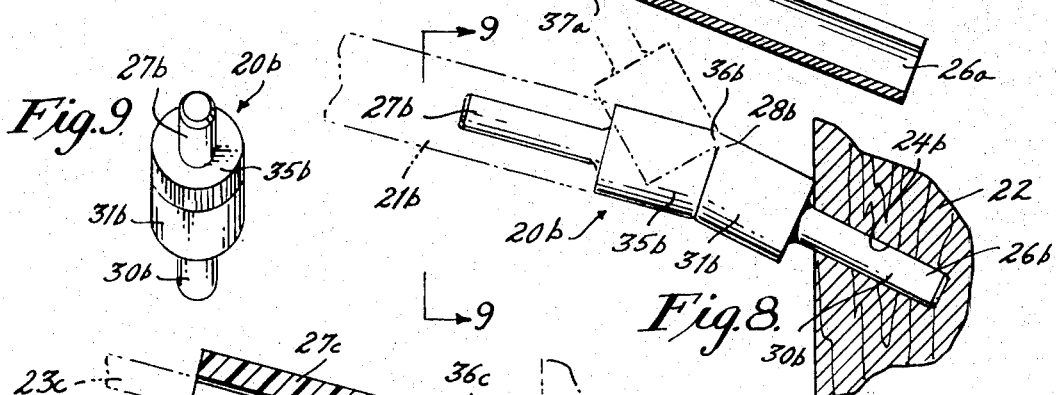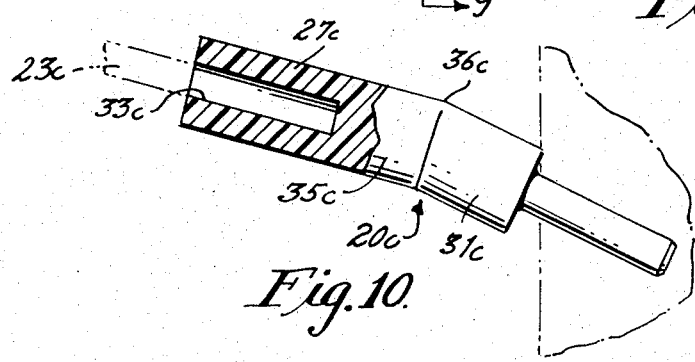

3,728,202
HINGE TYPE BRANCH HOLDER FOR ARTIFICIAL TREE
Ammon Baus, Philadelphia, and Frederick C. Keller, Cornwells Heights, Pa., assignors to Carey-McFall Company, Philadelphia, Pa.
Filed May 10, 1971, Ser. No. 141,505
Int. Cl. A41g 1/00
U.S. Cl. 161—24                    6 Claims

ABSTRACT OF THE DISCLOSURE

A connector for connecting a simulated branch to an artificial trunk, the connector including a branch holder, and a trunk attachment member, and pivot means swingably connecting together the branch holder and trunk attachment member.

BACKGROUND OF THE INVENTION

As is well known to those versed in the artificial tree arts, it has been proposed in the past to construct artificial trees of collapsible structure, so as to be swingable between extended or open positions and closed or collapsed positions without disassembly and reassembly of the parts. However, artificial tree constructions collapsible in nature have not heretofore found general public acceptance, as being relatively complex and expensive in manufacture, lacking reliability in use, and being relatively difficult to handle and convert between the collapsed and erected conditions.

SUMMARY OF THE INVENTION

It is, therefore, an important object of the present invention to provide a unique artificial tree construction which overcomes the above-mentioned difficulties, and more specifically to provide a hinge type connector for swingably connecting an artificial tree branch to an artificial tree trunk, permitting of quick and easy branch movement between an outstanding set-up condition and an upwardly extending, retracted or collapsed condition.

It is still a further object of the present invention to provide a branch connector for use in an artificial tree construction which is extremely simple in structure, capable of economic mass production, easily assembled with artificial tree branches and trunks, and which is durable and reliable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a partial elevational view showing an artificial tree construction in accordance with the teachings of the present invention, a collapsed branch condition being shown in phantom.

FIG. 2 is a sectional view taken genrally along the line 2—2 of FIG. 1.

FIG. 3 is a longitudinal sectional view taken generally along the line 3—3 of FIG. 2, showing the branch connector apart from the branch and trunk.

FIG. 4 is a top view taken generally along the line 4—4 of FIG. 3.

FIG. 5 is a side elevational view similar to FIG. 1, but showing a slightly modified embodiment of branch connector constructed in accordance with the teachings of the instant invention.

FIG. 6 is a top view taken generally along the line 6—6 of FIG. 5.

FIG. 7 is a longitudinal sectional view taken generally along the line 7—7 of FIG. 6.

FIG. 8 is a partial elevational view similar to FIG. 1, but showing another embodiment constructed in accordance with the teachings of the present invention, and illustrating a collapsed condition in phantom.

FIG. 9 is an end view taken generally along the line 9—9 of FIG. 8.

FIG. 10 is an elevational view similar to that shown in FIG. 8, but partly in section and illustrating another embodiment of the instant invention.

DESCRIPTION OF THE PREFERRED EMBODIMENTS

Referring now more particularly to the drawings, and specifically to FIG. 1 thereof, a connector is there generally designated 20, in connecting relation between an artificial tree branch 21, and a simulated tree trunk 22. The tree branch 21 may be of any desired type of construction, say the wound-wire type branch, or other, having an inner end region 23 adapted to be held by the connector 20. Also, the artificial tree trunk 22 may be of any desired type, say a wooden rod or dowel, or otherwise. In the illustrated embodiment, the trunk 22 is formed with a plurality of holes 24 for respectively receiving connectors 20.

The connector 20 may include an inner trunk attachment member 26, and an outer branch holder 27. The trunk attachment member 26 is adapted for attachment to the trunk 22, as by insertion into a trunk hole 24. The branch holder 27 is adapted to hold a branch 21, as by insertion of the branch end portion 23 into the branch holder. Further, adjacent end portions of the attachment member 26 and branch holder 27 are swingably or hingedly connected together by pivot means 28.

More specifically, the trunk attachment member includes a rod-like end or pin portion 30, say for snug frictional engagement in a trunk hole 24, and has a flattened end or pivot portion 31 adjacent to the branch holder 27.

The branch holder 27 may have a tubular outer end portion 32, formed with an internal, longitudinal hole or bore 33 opening, as at 34 through the outer end of the branch holder 27. The inner end of the branch holder 27 is bifurcated, as best seen in FIG. 4, to provide a pair of laterally spaced legs 35 located in overlapping relation with and on opposite sides of the adjacent end portion 31 of trunk attachment member 26. A pintle or pin 36 extends through the overlapping adjacent end portions 31 and 35 of member 26 and holder 27, combining to define the pivot means 28.

Further, extending laterally across and between the overlapping portions or legs 35, beneath the intermediate pivot portion 31, is a stop or limit member 37. Thus, the branch holder 27 is swingable between the outwardly projecting position of FIG. 3, with the stop or limit member 37 engaging the portion 31, and an upwardly extending collapsed position, as shown in phantom in FIG. 1, wherein the branch 21 will extend generally along or parallel to the trunk 22.

While the structure of FIG. 1 permits of quick, easy and economical assembly, as by mere insertion of the pin portion 30 into trunk hole 24, and branch portion 23 into holder bore 33, disassembly may also be accomplished, if desired. However, it is intended that the components remain assembled, and merely swung between the solid line, erected position of FIG. 1, and the phantom line collapsed position thereof.

Also, while the connector 20 is admirably well suited for manufacture of plastic, as by injection molding, or other suitable material, for economy and other advantages thereof, the connector may be fabricated of other material, if desired.

Referring now to FIGS. 5-7, a modified embodiment of connector is there generally designated 20a, and includes a trunk attachment member 26a, and a branch holder 27a, swingably connected together by pivot means 28.

More specifically, the trunk attachment member 26a may be fabricated, say of metal, as by rolling to a split tube formation 30a affording a resilient deflectability for snug frictional engagement in a tree trunk. The outer region of the attachment member 26a is defined by a pair of facing spaced ears 31a, preferably formed integrally with the split tube 30a of a single piece of sheet metal.

The branch holder 27a is also advantageously integrally fabricated of a single piece of sheet metal, which may be rolled or otherwise formed into a split tube 32a having a longitudinal internal hollow or bore 33a opening outwardly through outer end 34a. The inner end region of holder 27a is flattened to define a pair of spaced, facing ears 35a located in overlapping relation with and on opposite sides of the ears 31a of trunk attachment member 26a. A pintle or pivot pin 36a extends through the several overlapping portions or ears 31a and 35a to pivotally connect together the trunk attachment member 26a and branch holder 27a. Further, a stop or limit member 37a extends laterally and bridges the space between ears 35a, beneath the underside of the adjacent region of trunk attachment member 26a. As best seen in FIGS. 5 and 7, the branch holder 27a is in its limiting position of outwardly swinging movement, as limited by abutting engagement of the stop 37a with the underside of the adjacent portion of trunk attachment member 26a. Of course, the branch holder and associated branch are swingable upwardly into general parallelism with a simulated tree trunk receiving the trunk attachment member. By the inherent resilience of the split tube formations 30a and 32a, the trunk attachment member is frictionally snugly engageable in a tree trunk, while the branch holder is frictionally snugly engageable about a received branch end portion.

An additional embodiment of connector is shown in FIGS. 8 and 9, there being generally designated 20b, and including a trunk attachment member 26b, and a branch holder 27b, which are swingably connected together by pivot means 28b.

The trunk attachment member may include a rod-like extension 30b for engagement into a hole 24b of a simulated tree trunk 22.

The branch holder may include an outer rod-like portion 27b for supporting insertion into the end of a tubular or hollow branch, shown in phantom at 21b.

The inner adjacent end portions 31b and 35b of respective trunk attachment member 26b and branch holder 27b are advantageously of generally cylindrical configuration in end-to-end engagement, their adjacent ends being obliquely truncated for abutting engagement with each other. Further, a flexible connection element 36b may extend between the abuttingly engageable portions 31b and 35b, functioning as a hinge connecting the branch holder 27b for swinging movement between its limiting, outstanding position shown in solid lines in FIG. 8, and a collapsed, upwardly swung phantom position shown therein.

Advantageously the connector 20b of FIGS. 8 and 9 may be integrally fabricated, say of suitable plastic material, permitting of the flexible hinged connection element 36b.

A further slightly modified embodiment is shown in FIG. 10, wherein a connector 20c may be essentially identical to the connector 20b, including the pair of generally cylindrical, obliquely truncated abuttingly engageable adjacent portions 31c and 35c, hingedly connected together by an integral flexible connection element 36c. However, the extending end of branch holder 27c is of a tubular, outwardly opening configuration, having a central hollow or bore 33c for receiving therein a branch end position 23c.

From the foregoing, it is seen that the present invention provides an artificial tree construction which is extremely simple in structure, permitting of mass production economies, capable of quick and easy assembly, and which affords extreme convenience in opening or erecting for use, and closing or collapsing for storage, as well as otherwise advantageously provides its intended objects.

Although the present invention has been described in some detail by way of illustration and example for purposes of clarity of understanding, it is understood that certain changes and modifications may be made within the spirit of the invention.

What is claimed is:

1. An artificial tree construction comprising a simulated trunk, a plurality of branches extending from said trunk, and a plurality of connectors each pivotally connecting a respective branch to said trunk, said connectors each comprising a branch holder secured to the inner end of a respective branch, a trunk attachment member for attachment to the trunk, and pivot means swingably connecting together said branch holder and trunk attachment member, said pivot means comprising adjacent overlapping portions of said branch holder and trunk attachment member, and a pin extending transversely through said overlapping portions, said holder having its inner region of generally U-shaped cross section and receiving between the side walls thereof said attachment member to define said overlapping portions, and the bight region of said U-shaped cross-section being engageable with said received attachment member to limit said holder movement to an open position with said branch extending from said trunk.

2. An artificial tree construction according to claim 1, said holders each being tubular and opening outwardly for receiving the inner end of a branch.

3. An artificial tree construction comprising a simulated trunk, a plurality of branches extending from said trunk, and a plurality of connectors each pivotally connecting a respective branch to said trunk, said connectors each comprising a branch holder secured to the inner end of a respective branch, a trunk attachment member for attachment to the trunk, and pivot means swingably connecting together said branch holder and trunk attachment member, said trunk attachment members each being elongate and generally straight for insertion into said trunk, said pivot means comprising adjacent abuttingly engageable portions of said branch holder and trunk attachment member, and a flexible connection element extending between said portions for relative movement thereof between an open branch position outstanding from the trunk and a closed branch position upstanding along the trunk.

4. An artificial tree construction according to claim 3, said portions and connection element being integrally fabricated of plastic.

5. An artificial tree construction according to claim 4, said portions being generally cylindrical and in end-to-end relation with their adjacent ends truncated for abutting engagement when in said open branch position.

6. An artificial tree construction according to claim 1, said branch holders and trunk attachment members being of split tubular construction for resilient radial expansion and compression.

References Cited

UNITED STATES PATENTS

| | | | |
|---|---|---|---|
| 3,115,435 | 12/1963 | Abramson | 161—24 |
| 3,463,696 | 8/1969 | Baus et al. | 161—24 |
| 3,574,102 | 4/1971 | Hermanson | 161—24 X |
| 3,159,523 | 12/1964 | Abramson | 161—24 |

PHILIP DIER, Primary Examiner

U.S. Cl. X.R.

211—178